United States Patent
Yu et al.

(10) Patent No.: US 9,258,089 B2
(45) Date of Patent: Feb. 9, 2016

(54) SYSTEM AND METHODS FOR COMPRESS AND FORWARD RELAYING SCHEMES IN JOINT SIGNAL PROCESSING

(71) Applicants: FutureWei Technologies, Inc., Plano, TX (US); The Governing Council of the University of Toronto, Toronto (CA)

(72) Inventors: Wei Yu, Toronto (CA); Yuhan Zhou, Toronto (CA); Jianglei Ma, Ottawa (CA); Peiying Zhu, Kanata (CA); Mohammadhadi Baligh, Kanata (CA)

(73) Assignees: Futurewei Technologies, Inc., Plano, TX (US); The Governing Council of the University of Toronto, Toronto, ON ( * ) Notice: Subject to any disclaimer, the term of this patent is extended or adjusted under 35 U.S.C. 154(b) by 86 days.

(21) Appl. No.: 14/163,375

(22) Filed: Jan. 24, 2014

(65) Prior Publication Data

US 2014/0211687 A1 Jul. 31, 2014

Related U.S. Application Data

(60) Provisional application No. 61/756,815, filed on Jan. 25, 2013, provisional application No. 61/814,631, filed on Apr. 22, 2013, provisional application No. 61/909,809, filed on Nov. 27, 2013.

(51) Int. Cl.
*H04L 5/00* (2006.01)
*H04L 25/02* (2006.01)
(Continued)

(52) U.S. Cl.
CPC .............. *H04L 5/0032* (2013.01); *H04B 7/00* (2013.01); *H04B 7/024* (2013.01); *H04L 5/0035* (2013.01); *H04L 25/0204* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 8,675,511 B2* | 3/2014 | Gorokhov | ............. | H04L 5/0035 370/252 |
| 8,934,557 B2* | 1/2015 | Cavalcante | ............. | H04B 7/024 370/252 |

(Continued)

OTHER PUBLICATIONS del Caso, A., "Distributed Compression for MIMO Coordinated Networks With a Backhaul Constraint," IEEE Transactions on Wireless Communications, vol. 8, No. 9, Sep. 2009, pp. 4698-4709.

(Continued)

*Primary Examiner* — Candal Elpenord
(74) *Attorney, Agent, or Firm* — Slater & Matsil, L.L.P.

(57) ABSTRACT

Embodiments are provided for a compress and forward relaying scheme in joint multi-cell processing. A plurality of base stations receive similar combinations of user signals from a plurality of users, compress the signals using quantization, and relay the signals over respective backhaul links to a processor in the network for decoding the signal. The processor determines suitable quantization noise levels for the backhaul links according to a weighted sum-rate maximization function for optimizing the quantization noise levels, subject to a backhaul sum capacity constraint on the backhaul links. The determined quantization noise levels are sent to the base stations, which then quantize the received combinations of user signals according to the quantization noise levels and relay the quantized signals to the processor. The quantization is according to a Wyner-Ziv coding or a single user compression algorithm that excludes statistical correlations between the user signals at the base stations.

23 Claims, 4 Drawing Sheets

(51) Int. Cl.
*H04W 72/04* (2009.01)
*H04B 7/00* (2006.01)
*H04B 7/02* (2006.01)

(56) References Cited

U.S. PATENT DOCUMENTS

| | | | | |
|---|---|---|---|---|
| 9,031,032 | B2* | 5/2015 | Xiao | H04W 52/243 370/328 |
| 2007/0066239 | A1* | 3/2007 | Hart | H04W 52/241 455/69 |
| 2007/0213065 | A1* | 9/2007 | Kang | H04W 16/26 455/442 |
| 2008/0298486 | A1 | 12/2008 | Venturino et al. | |
| 2009/0016415 | A1 | 1/2009 | Chakrabarti et al. | |
| 2010/0157901 | A1 | 6/2010 | Sanderovitz et al. | |
| 2011/0149877 | A1* | 6/2011 | Hafeez | H04B 7/024 370/329 |
| 2011/0312363 | A1* | 12/2011 | Kolding | H04B 7/024 455/513 |
| 2012/0002743 | A1 | 1/2012 | Cavalcante et al. | |
| 2012/0015680 | A1* | 1/2012 | Yang | H04B 7/022 455/517 |
| 2012/0069928 | A1 | 3/2012 | Jose et al. | |
| 2012/0140660 | A1* | 6/2012 | Kang | H04L 1/0077 370/252 |
| 2012/0287799 | A1* | 11/2012 | Chen | H04B 7/024 370/252 |
| 2014/0177456 | A1* | 6/2014 | Boudreau | H04W 72/0406 370/252 |

OTHER PUBLICATIONS

Lim, S., et al., "Noisy Network Coding," IEEE Transactions on Information Theory, vol. 57, No. 5, May 2011, pp. 3132-3152.

Park, S., et al., "Robust and Efficient Distributed Compression for Cloud Radio Access Networks," IEEE Transactions on Vehicular Technology, vol. 62, No. 2, Feb. 2013, pp. 692-703.

Sanderovich, A., et al., "Communication Via Decentralized Processing," IEEE Transactions on Information Theory, vol. 54, No. 7, Jul. 2008, pp. 3008,3023.

Sanderovich, A., et al., "Uplink Macro Diversity of Limited Backhaul Cellular Network," IEEE Transactions on Information Theory, vol. 55, No. 8, Aug. 2009, pp. 3457-3478.

Zhou, Y., "Uplink Cloud Radio Access Network with Capacity-Limited Backhaul", submitted to IEEE Journal on Selected Areas in Communications, Special Issue on 5G Wireless Communication Systems, Dec. 2013, 12 pages.

Zhou, L., et al., "Uplink Multicell Processing With Limited Backhaul Via Successive Interference Cancellation," 2012 IEEE Global Communications Conference (GLOBECOM), Dec. 3-7, 2012, pp. 2322-2327.

Zhou, Y., et al., "Uplink Multi-cell Processing: Approximate Sum Capacity Under a Sum Backhaul Constraint," 2013 IEEE Information Theory Workshop (ITW), Sep. 9-13, 2013, pp. 1-5.

International Search Report received in Application No. PCT/US14/13032, mailed Jun. 23, 2014, 11 pages.

\* cited by examiner

SYSTEM AND METHODS FOR COMPRESS AND FORWARD RELAYING SCHEMES IN JOINT SIGNAL PROCESSING

This application claims the benefit of U.S. Provisional Application No. 61/756,815 filed on Jan. 25, 2013 by Wei Yu et al. and entitled "System and Method for a Joint Signal Processing Compress and Forward Relaying Scheme," U.S. Provisional Application No. 61/814,631 filed on Apr. 22, 2013 by Wei Yu et al. and entitled "System and Method for a Joint Signal Processing Compress and Forward Relaying Scheme," and U.S. Provisional Application No. 61/909,809 filed on Nov. 27, 2013 by Yuhan Zhou et al. and entitled "Compress and Forward Relaying Scheme for Uplink Multi-Cell Processing with Limited Sum Backhaul," which are hereby incorporated herein by reference as if reproduced in their entirety.

TECHNICAL FIELD

The present invention relates to the field of wireless communications, and, in particular embodiments, to a system and methods for compress and forward relaying schemes in joint signal processing.

BACKGROUND

Joint multi-cell processing (MCP), where the transmitted and received signals and the channel state information are shared between base stations via backhaul links, is an efficient way to mitigate out-of-cell interference. Generally, a centralized signal processor in cloud radio access network (RAN) makes MCP possible. In MCP, a base station (BS) sends log likelihood ratio (LLR) soft bits to the central processor, which generally requires a large amount of backhaul bandwidth. The base station sends decoded bits to the central processor, but does not take full advantage of joint MCP. The central processor performs successive interference cancellation on a per-BS basis. However, this implementation also does not take full advantage of joint MCP. There is a need for efficient compress and forward relaying schemes in joint signal processing between base stations and the central processor, which considers backhaul link capacity.

SUMMARY OF THE INVENTION

In accordance with an embodiment, a method implemented by a network component for supporting compress and forward relaying in joint multi-cell processing (MCP) includes establishing a weighted sum-rate maximization function which allows optimization of quantization noise levels for a plurality of backhaul links from a plurality of radio nodes to a network for joint MCP. The weighted sum-rate maximization function is subject to a backhaul sum capacity constraint on the backhaul links. The method further includes determining the quantization noise levels using an alternating convex optimization of the weighted sum-rate maximization function.

In accordance with another embodiment, a method implemented by a base station for compress and forward relaying in joint MCP includes receiving a plurality of user signals from a plurality of user terminals, wherein the user signals are sent from the user terminals to a plurality of base stations including the base station. The method further includes receiving an assigned quantization noise level from a network. The assigned quantization noise level is one of a plurality of quantized noise levels determined for the base stations using an alternating convex optimization of a weighted sum-rate maximization function subject to a backhaul sum capacity constraint on backhaul links between the base stations and the network. A combination signal of the user signals is then quantized according to the assigned quantization noise level, and relayed to the network.

In accordance with another embodiment, a network component for supporting compress and forward relaying in joint MCP includes at least one processor and a non-transitory computer readable storage medium storing programming for execution by the at least one processor. The programming includes instructions to establish a weighted sum-rate maximization function which allows optimization of quantization noise levels for a plurality of backhaul links from a plurality of radio nodes to the network component for joint MCP. The weighted sum-rate maximization function is subject to a backhaul sum capacity constraint on the backhaul links. The programming includes further instructions to determine the quantization noise levels using an alternating convex optimization of the weighted sum-rate maximization function.

In accordance with yet another embodiment, a radio node for compress and forward relaying in joint MCP includes at least one processor and a non-transitory computer readable storage medium storing programming for execution by the at least one processor. The programming includes instructions to receive a plurality of user signals from a plurality of user terminals. The user signals are sent from the user terminals to a plurality of base stations including the base station. The programming includes further instructions to receive an assigned quantization noise level from a network. The assigned quantization noise level is one of a plurality of quantized noise levels determined for the base stations using an alternating convex optimization of a weighted sum-rate maximization function subject to a backhaul sum capacity constraint on backhaul links between the base stations and the network. The instructions further include quantizing a combination signal of the user signals, according to the assigned quantization noise level, using Wyner-Ziv coding or a single user compression algorithm that excludes statistical correlations between the user signals at the base stations. The programming includes further instructions to relay the quantized combination signal to the network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for using multi-cell processing (MPC) based compress-and-forward relaying schemes at base stations (BSs) or any type of radio nodes (e.g., eNBs, relays, femto cells, pico cells) for uplink transmissions in a cloud radio access network (CRAN) environment. The schemes implement different quantization approaches considering a sum of backhaul links constraint. The backhaul links connect multiple BSs to a cloud based or remote centralized signal processor. The schemes herein allow the BSs to compress or quantize signals received from multiple users and relay the compressed signals to the centralized processor. The processor then decompresses the signals, according to the applied compression/quantization, and decodes the messages from the users. This joint signal processing approach is efficient to mitigate out-of-cell or inter-user interference.

The compression and quantization schemes include a Wyner-Ziv compression scheme and a single user compression scheme, which solve a weighted sum-rate maximization problem for optimizing quantization noise levels on the backhaul links. The optimization is performed by a central or cloud processor connected via backhaul links to the BS using global channel state information between the BSs and the terminals. The central or cloud processor then sends the optimized quantization noise levels the BS encoders, which implements quantization and compression accordingly. The cloud decoder also performs MCP according to the optimized quantization noise levels. In another embodiment, a BS can implement the optimization given the global channel state information. This information allows better management and allocation of backhaul links to the BSs. For both schemes, setting the quantization noise levels to be proportional to the background noise and the residual interference level presents a near optimal solution for sum-rate maximization. These schemes can be extended, as described below to the scenario of heterogeneous networks, where different network tiers have different sum backhaul constraints. The schemes can also be implemented for multiple-input and multiple-output (MIMO) systems, and for frequency selective channels, e.g., based on orthogonal frequency-division multiplexing (OFDM) or single-carrier modulation.

Figure 1:
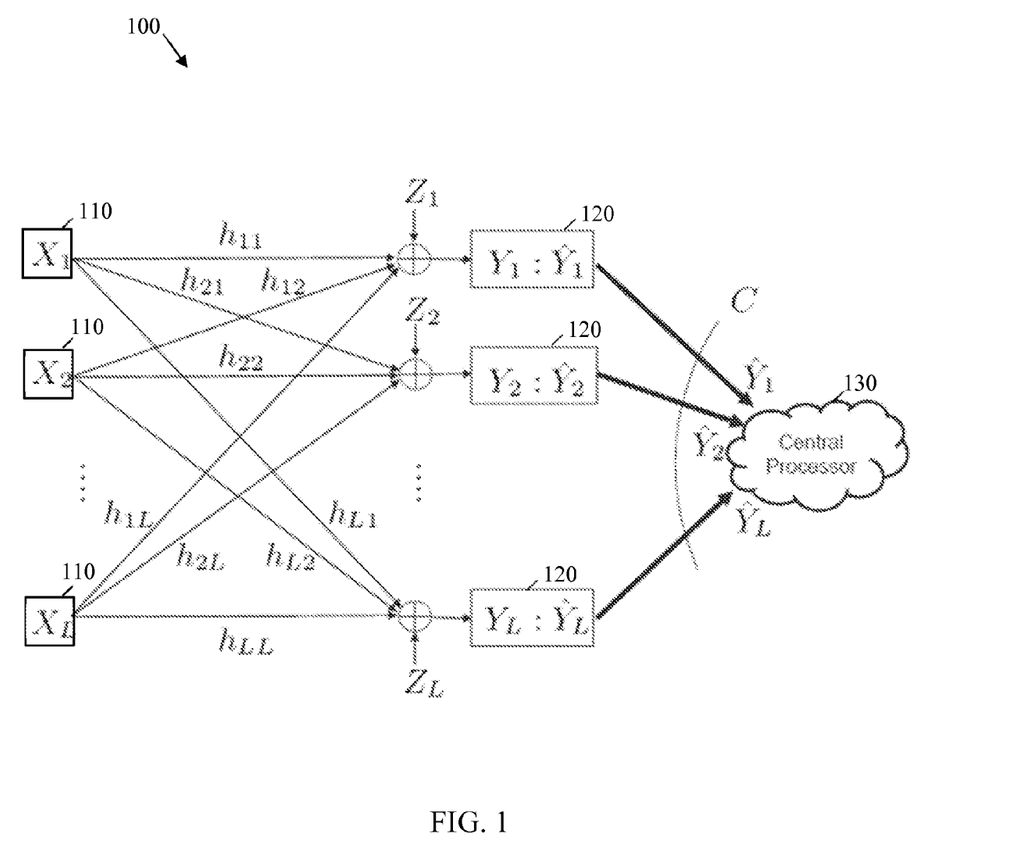
FIG. 1 illustrates a system for uplink multi-cell joint processing via a central processor in a cloud radio access network.

FIG. 1 shows a system 100 for uplink multi-cell joint processing via a central processor in a cloud radio access network. The system 100 includes a plurality of user equipments (UEs) or terminals 110 that transmit corresponding messages (or user signals) to a plurality of BSs 120. Examples of user terminals 110 include smartphones, computer tablets, laptop computers, or any personal/mobile device with wireless communications capability. The user messages are labeled $X_1, X_2, \ldots, X_L$, where L is an integer. In this case, both the number of users (and user messages) and the number of BSs are equal to L., and the uplink MCP model can be thought of as an L×L interference channel between the users and the BSs. Specifically, each terminal 110 sends a copy of its signal to one of the BSs 120. As such, each BS 120 receives a combined signal of the messages from all terminals 110. The received signals by the BSs 120 are labeled $Y_1, Y_2, \ldots, Y_L$. Both the user terminals 110 and BSs 120 use single antennas for transmitting/receiving the signals. Upon receiving the user signals, each BS 120 quantizes the received copy of the user signal using one of the compression and quantization algorithms described herein (the Wyner-Ziv and the single user compression algorithms), and sends the corresponding quantized signal ($\hat{Y}_i$) via a backhaul link to a cloud based or remote central processor 130. The processor 130 then decodes the quantized signals from all BSs 120 for each user or terminal 110 then decodes the messages from the terminals 110 either jointly or successively. Since multiple copies of the signal from each user are used to decode the user message, this uplink multi-cell joint processing approach reduces or mitigates effectively the inter-user interference (interference between signals received from multiple users at the BS). The compression and quantization algorithms are needed for relaying the signals from the BSs 120 to the processor 130 due to the capacity limitation (e.g., limited bandwidth) in the backhaul links between the BSs 120 and the central processor 130.

The Wyner-Ziv and the single user compression algorithms optimize backhaul quantization levels to enable the joint reception of user signals at the BSs 120, subject to total backhaul bandwidth constraint. The backhaul link quantization levels are jointly optimized to maximize system performance subject to the sum backhaul capacity constraint. The traffic to be relayed from the BSs 120 to the processor 130, also referred to herein as backhaul traffic, is compressed according to the optimized quantization levels. The algorithms use an alternating convex optimization method to find the optimal quantization noise level, which can be solved through a backhaul capacity allocation optimization, as described below. Both the Wyner-Ziv compression and single user compression can be more efficient than other MCP schemes.

In an embodiment, a virtual multiple access channel Wyner-Ziv (VMAC-WZ) coding scheme uses compress-and-forward relaying at the BSs 120. Each BS 120 quantizes the received signal $Y_i$ into $\hat{Y}_i$ using the Wyner-Ziv compression algorithm. The transmitted messages $X_1, X_2, \ldots, X_L$ are then decoded, at the processor 130, sequentially or jointly after the decoding of the quantized received signals $\hat{Y}_i$ from the BSs 120. As such, the user terminals 110 and the central processor 130 form a virtual multiple-access channel.

In another embodiment, a virtual multiple access channel single user (VMAC-SU) coding scheme employs single user compression (instead of Wyner-Ziv compression) at each BS 120. Unlike the Wyner-Ziv compression, which takes received signal information at other BSs 120 into account, single user compression is easier for practical implementations since the single user compression algorithm does not require each BS 120 to know the global channel state information. Specifically, the single user compression does not take advantage of the statistical correlations between the received signals at different BSs. Instead, each BS quantizes its received signals using a vector quantizer. The processor 130 decodes the quantized signals form the BSs 120 according to the single user compression algorithm.

The VMAC-WZ and VMAC-SU schemes and algorithms are described in detail by Yuhan Zhou and Wei Yu in "Uplink Cloud Radio Access Network with Capacity Limited Backhaul," submitted to IEEE Journal on Selected Areas in Communications on Nov. 30, 2013, and by Yuhan Zhou et al. in "Uplink Multi-Cell Processing: Approximate Sum Capacity under a Sum Backhaul Constraint," in Proceedings of IEEE Information Theory Workshop, presented on Sep. 9-13, 2013, in Seville, Spain, which are hereby incorporated by reference as if reproduced in their entirety. In both schemes, when the signal to quantization and noise ratio (SQNR) is high, where both the signal to noise ratio (SNR) of received signals at the BSs and the backhaul capacity are high enough (beyond an acceptable threshold), setting the quantization noise level (noise due to quantization) to be proportional to the background noise and residual interference level becomes optimal for sum-rate maximization. Under a finite capacity constraint (C) and a finite SNR, the VMAC-SU scheme with quantization noise level proportional to the background noise and residual interference level can approach the sum capacity of the uplink MCP model described above when the interference channel satisfies a diagonally dominant channel criterion. The weighted sum-rate maximization problem can be formulated as a backhaul capacity allocation optimization problem, and hence efficiently solved.

In an embodiment, assuming a single antenna at both BSs and users, an alternating convex optimization algorithm is used in the VMAC-WZ scheme to efficiently find the optimal quantization noise level that maximizes the weighted sum-rate. The alternating convex optimization algorithm can also be used in the VMAC-SU scheme. In other embodiments for the VMAC-WZ scheme and the VMAC-SU scheme, a heuristic algorithm is used to find approximate optimal quantization noise levels with low complexity. Simulations show that the heuristic algorithm works well in practice.

As described above, the VMAC-WZ and VMAC-SU schemes and algorithms may be implemented in Long Term Evolution (LTE) and other wireless networks, CRAN deployments in various access networks, and the like. Both schemes can also be applied for multiple-input and multiple-output (MIMO) systems, where the user terminals and the base stations are equipped with multiple antennas. The algorithms can also be extended to the heterogeneous network scenario where different tiers (e.g., macro cells and micro cells) have different sum backhaul constraints. The embodiment VMAC schemes (Wyner-Ziv compression and single user compression) with optimized quantization noise levels can significantly improve the overall performance of both multi-cell networks and heterogeneous networks. For instance, the decoding algorithms used herein achieve a higher rate than the per-BS successive interference cancellation schemes. Since the VMAC-WZ and VMAC-SU schemes are applicable to UL joint reception with limited backhaul or cost/bit backhaul, the schemes enable massive deployment of macro or small RAN nodes connected to a central controller. Further, the VMAC scheme with single user compression has a lower decoding complexity than other schemes.

In an embodiment according to the VMAC-WZ scheme, under a backhaul sum-capacity constraint, the weighted sum-rate maximization problem is stated follows:

$$\max_{\Lambda_q} \sum_{i=1}^{L} \mu_i \log \frac{\left| \sum_{j=i}^{L} P_j h_j h_j^H + \text{diag}(\sigma_i^2) + \Lambda_q \right|}{\left| \sum_{j>i}^{L} P_j h_j h_j^H + \text{diag}(\sigma_i^2) + \Lambda_q \right|} \quad (1)$$

$$\text{s.t. } \log \frac{\left| \sum_{i=1}^{L} P_i h_i h_i^H + \text{diag}(\sigma_i^2) + \Lambda_q \right|}{|\Lambda_q|} \leq C,$$

$$\Lambda_q(i,j) = 0, \text{ for } i \neq j,$$

$$\Lambda_q(i,i) > 0,$$

where $h_{ij}$ denotes the real channel from the j-th user to the i-th BS, $\sigma^2$ is the variance, $\mu_i$'s are the weights representing the priorities associated with the users, and $\mu_i$'s satisfy $\mu_L \geq \mu_{L-1} \geq, \ldots, \geq \mu_1 > \mu_0 = 0$. The parameter $\Lambda_q(i,j)$ is the (i,j)-th entry of matrix $\Lambda_q$, which is obtained as $\Lambda_q = \text{diag}(q_1, q_2, \ldots, q_L)$, where $q_i$ is the quantization noise level for the i-th BS. The weighted sum-rate maximization problem can be reformulated approximately as follows:

$$\max_{\Lambda_q, \Sigma} \sum_{i=1}^{L} (\mu_i - \mu_{i-1}) \log \left| \sum_{j=i}^{L} P_j h_j h_j^H + \text{diag}(\sigma_i^2) + \Lambda_q \right| - \quad (2)$$

$$\mu_L \log |\Sigma| - \mu_L \text{tr} \left( \sum^{-1} (\text{diag}(\sigma_i^2) + \Lambda_q) \right)$$

$$\text{s.t. } \log \frac{\left| \sum_{i=1}^{L} P_i h_i h_i^H + \text{diag}(\sigma_i^2) + \Lambda_q \right|}{|\Lambda_q|} \leq C,$$

$$\Lambda_q(i,j) = 0, \Sigma(i,j) = 0 \text{ for } i \neq j,$$

$$\Lambda_q(i,i) > 0, \Sigma(i,i) > 0.$$

When either $\Lambda_q$ or $\Sigma$ is fixed, the problem is convex with respect to the other decision variable.

An alternating convex optimization algorithm is used to solve the problem. The algorithm first initializes the weighted sum-rate as $\Lambda_q^{(0)} = \Sigma^{(0)} = \gamma I$. At a second step, the convex optimization problem is solved with respect to $\Lambda_q$ by fixing $\Sigma = \Sigma^{(i)}$ and setting $\Lambda_q^{(i+1)}$ to be the optimal point. At a third step, $\Sigma^{(i+1)}$ is updated as $\Sigma^{(i+1)} = \text{diag}(\sigma_i^2) + \Lambda_q^{(i+1)}$. The second and third steps are repeated until the solution converges to a value. With respect to local convergence, for any initial point $(\Lambda_q^{(0)}, \Sigma^{(0)})$, the limit point $(\Lambda_q^*, \Sigma^*)$ generated by the alternating optimization algorithm above converges to a stationary point of the weighted sum-rate maximization problem in equation (1) above.

According to the VMAC-SU scheme, the weighted sum-rate maximization problem is stated as follows:

$$\max_{\Lambda_q} \sum_{i=1}^{L} \mu_i \log \frac{\left| \sum_{j=i}^{L} P_j h_j h_j^H + \text{diag}(\sigma_i^2) + \Lambda_q \right|}{\left| \sum_{j>i}^{L} P_j h_j h_j^H + \text{diag}(\sigma_i^2) + \Lambda_q \right|} \quad (3)$$

-continued $$\text{s.t.} \sum_{i=1}^{L} \log\left(1 + \frac{\sum_{j=i}^{L} P_j |h_{ij}|^2 + \sigma^2}{q_i}\right) \leq C$$

$$\Lambda_q(i,j) = 0, \text{ for } i \neq j,$$

$$\Lambda_q(i,i) > 0,$$

where $\Lambda_q(i,j)$ is the (i,j)-th entry of matrix $\Lambda_q$.

The alternating convex optimization method can also be used in this case to find the optimal quantization noise level. When single user compression is applied, the problem in equation (3) above can be reformulated as:

$$\max \sum_{i=1}^{L} (\mu_i - \mu_{i-1}) \log\left|\text{diag}\left(\frac{1}{\gamma_i}\right) \sum_{j=i}^{L} P_j h_j h_j^H + I\right| \quad (4)$$

$$\sum_{i=1}^{L} C_i \leq C, C_i \geq 0, i = 1, \ldots, L$$

where $\gamma_i = \frac{\sum_{j=i}^{L} P_j |h_{ij}|^2 + \sigma_i^2 2^{C_i}}{2^{C_i} - 1}$, for $i = 1, \ldots, L$.

The problem in equation (4) only involves linear constraints, which can be efficiently solved through dualizing with respect to the sum backhaul constraint.

For both the VMAC-WZ and VMAC-SU schemes, when both the SNR and C are high enough, setting the quantization noise level to be proportional to the background noise and residual interference level is near optimal for the sum-rate maximization. In an embodiment, a heuristic algorithm is used to find approximate optimal quantization noise levels. As such, a function $$C_{WZ}(\alpha) = \log\frac{|HK_X H^H + (1+\alpha)\text{diag}(\sigma_i^2)|}{|\alpha \text{diag}(\sigma_i^2)|}$$

is defined for Wyner-Ziv coding, where H is the channel matrix and $K_X = E[X X^H]$ is the transmit signal covariance matrix. For single user compression, a function $$C_{SU}(\alpha) = \sum_{i=1}^{L} \log\left(1 + \frac{\sum_{j=i}^{L} P_j |h_{ij}|^2 + \sigma_i^2}{\alpha \sigma_i^2}\right)$$

is defined instead. The algorithm includes the following steps. First a value $\alpha=1$ is set. While the relation $C_{WZ}(\alpha) > C$ (or $C_{SU}(\alpha) > C$) remains true, the step of setting $\alpha = 2\alpha$ is repeated (e.g., in multiple iterations). Next, the values $\alpha_{max} = \alpha$ and $\alpha_{min} = 0$ are set. The equation $C_{WZ}(\alpha) = C$ (or $C_{SU}(\alpha) = C$) is then solved using bisection in $[\alpha_{min}, \alpha_{max}]$. Finally, $q_i = \alpha \sigma_i^2$ is calculated. The performance of the VMAC-SU scheme approaches that of the VMAC-WZ scheme as C becomes larger. The bisection algorithm above is one possible solution approach for solving $C_{WZ}(\alpha) = C$ (or $C_{SU}(\alpha) = C$). However, any numerical methods for solving the equation $C_{WZ}(\alpha) = C$ (or $C_{SU}(\alpha) = C$) can be used to calculate the optimal $\alpha$ and the optimal $q_i$. In another embodiment, $C_{WZ}(\alpha)$ or $C_{SU}(\alpha)$ is replaced by an expression representing the backhaul capacity needed as a function of the quantization noise level $\alpha$.

In an embodiment, the VMAC schemes may be applied to multi-tier heterogeneous networks with macro-cells and pico-cells (or small cells) as follows. Set the matrix $C_M$ for the sum backhaul capacity across the macro-BSs, and $C_p$ for the backhaul constraint for pico-BSs. Assuming a VMAC-SU implementation, the backhaul constraints can be expressed as:

$$\text{maximize} \sum_{i=1}^{L} \mu_i \log \frac{\left|\sum_{j=i}^{L} P_j h_j h_j^H + \text{diag}(\sigma_i^2) + \Lambda_q\right|}{\left|\sum_{j>i}^{L} P_j h_j h_j^H + \text{diag}(\sigma_i^2) + \Lambda_q\right|} \quad (5)$$

$$\text{subject to} \sum_{i \in S_m} \log\left(1 + \frac{\sum_{j=i}^{L} P_j |h_{ij}|^2 + \sigma_i^2}{q_i}\right) \leq C_m$$

$$\sum_{i \in S_p} \log\left(1 + \frac{\sum_{j=i}^{L} P_j |h_{ij}|^2 + \sigma_i^2}{q_i}\right) \leq C_p$$

$$\Lambda_q(i,j) = 0, \text{ for } i \neq j,$$

$$\Lambda_q(i,i) > 0,$$

where $S_m$ and $S_p$ are the sets of macro-BSs and pico-BSs, respectively.

Approximate optimal quantization noise levels can be found for multi-tier heterogeneous networks, as follows. The average SNR at each BS is defined as $$\overline{SNR_i} = \frac{\sum_{j=1}^{L} P_j |h_{ij}|^2}{\sigma_i^2} \cdot \text{Set } C_{SU}(\beta) = \sum_{i \in S} \log\left(\frac{1-\beta}{\beta} \overline{SNR_i} + \frac{1}{\beta}\right)$$

as the sum backhaul capacity across a particular tier (where S and $S_m$ for macro-BSs or $S_p$ for pico-BSs). An efficient algorithm for finding the approximately optimal quantized noise level (or equivalently the backhaul capacity) can run simultaneously in each tier as follows. First, $\beta_{min} = 0$ and $\beta_{max} = 1$ are set. Next, $C_{SU}(\beta) = C$ is solved using bisection in $[\beta_{min}, \beta_{max}]$ or using an alternate numerical method. Finally, $$q_i = \frac{\beta}{1-\beta}\sigma_i^2 \text{ and } C_i = \log\left(\frac{1-\beta}{\beta}\overline{SNR_i} + \frac{1}{\beta}\right)$$

are calculated. The algorithm above is one possible solution approach for solving $C_{SU}(\beta) = C$. However, any numerical methods for solving $C_{SU}(\beta) = C$ can be used to calculate the optimal $\beta$ and the optimal $q_i$.

Details of the schemes and algorithms above are described by Yuhan Zhou and Wei Yu in "Uplink Cloud Radio Access Network with Capacity Limited Backhaul". The rate expressions used in the optimization algorithms above for representing uplink rates (weighted sum-rate) between terminals and BSs and for the backhaul rate may correspond to information theoretical capacities. However, the optimization algorithms can use any suitable practical rate expressions (for uplink rates and backhaul rate), which may be different depending on the actual coding and modulation schemes of the system. Although, the formulations of the algorithms include a sum-backhaul constraint, in practical implementation, there may be a combination of per-BS backhaul constraints or sum backhaul constraints over a subset of BSs, e.g., as in the case of heterogeneous networks. Any suitable formulation of backhaul constraints for the BSs can be used instead of the sum-backhaul constraint formulations above.

Figure 2:
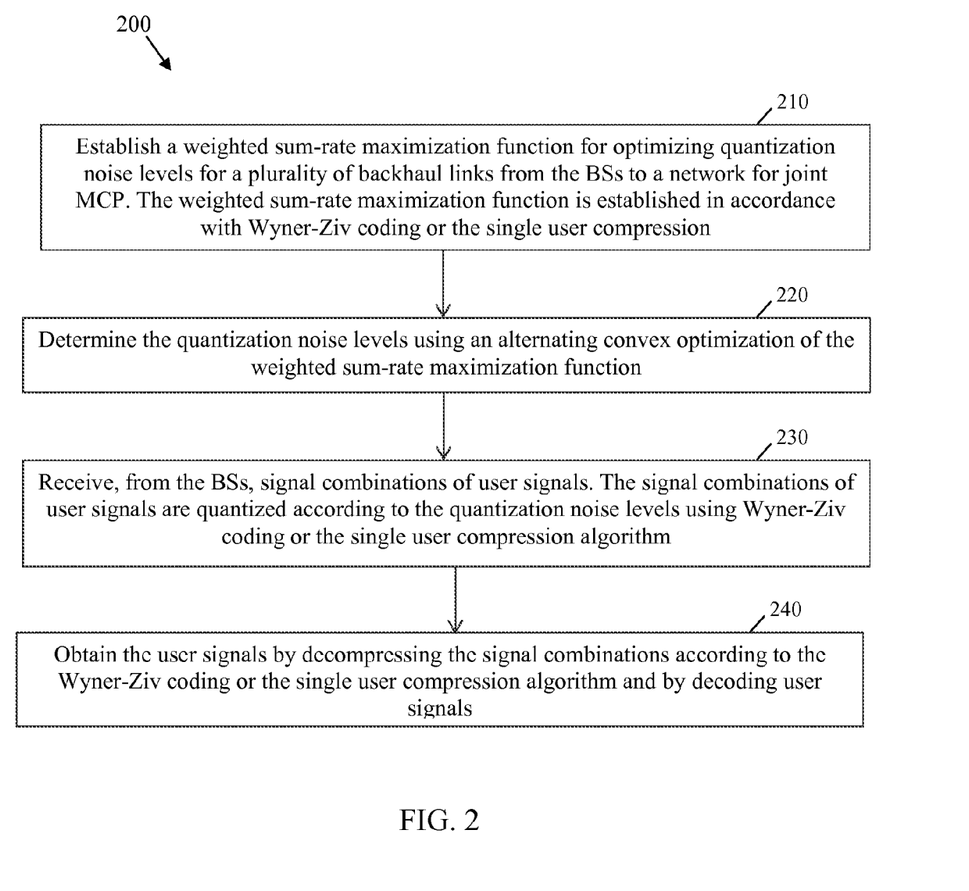
FIG. 2 illustrates an embodiment method for enabling compress and forward relaying in MCP in joint multi-cell processing (MCP)

FIG. 2 shows an embodiment method 200 for enabling compress and forward relaying in MCP. The method 200 can be implemented at a central or cloud processor. At step 210, the method 200 establishes a weighted sum-rate maximization function for optimizing quantization noise levels for a plurality of backhaul links from the BSs to a central processor for joint MCP. The weighted sum-rate maximization function is subjected to a backhaul sum capacity constraint on the backhaul links. The weighted sum-rate maximization function is established in accordance with Wyner-Ziv coding or the single user compression. At step 220, the quantization noise levels are determined using an alternating convex optimization of the weighted sum-rate maximization function, as described above. At step 230, signal combinations of user signals are received from the BSs. The signal combinations of user signals are quantized according to the quantization noise levels using Wyner-Ziv coding or the single user compression algorithm. At step 240, the user signals are obtained by decompressing the signal combinations according to the Wyner-Ziv coding or the single user compression algorithm and by decoding user signals. In another embodiment, the BS may implement at least some of the steps above if global channel state information is available to the BS.

Figure 3:
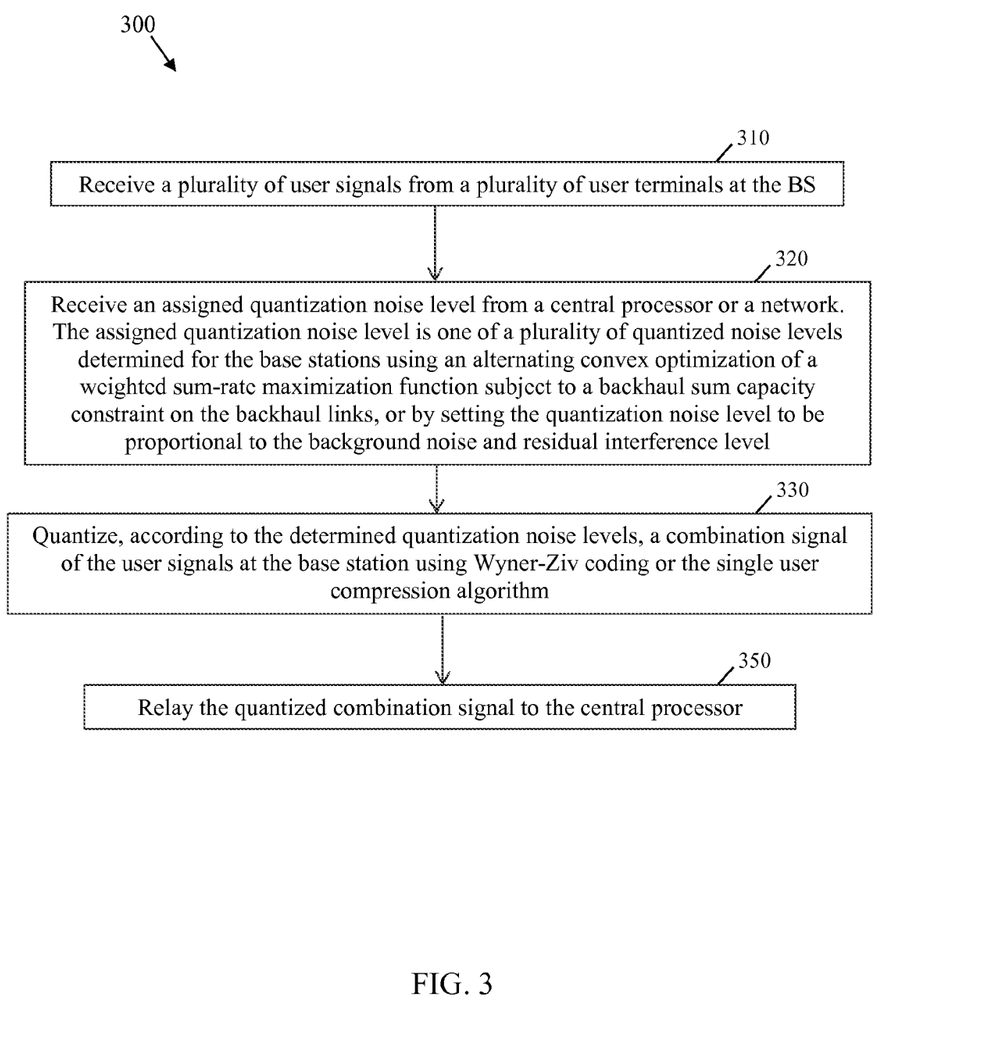
FIG. 3 illustrates an embodiment method for compress and forward relaying in MCP in joint MCP.

FIG. 3 shows an embodiment method 300 for compress and forward relaying in MCP. The method 300 can be implemented at each BS connected to a central or cloud processor. At step 310, a plurality of user signals from a plurality of user terminals are received at the BS. Copies of the user signals are also sent from the user terminals to multiple BSs. At step 320, The BS receives an assigned quantization noise level from the central processor or the cloud network. The assigned quantization noise level is one of a plurality of quantized noise levels determined for the base stations using an alternating convex optimization of a weighted sum-rate maximization function subject to a backhaul sum capacity constraint on the backhaul links. When the SQNR is high, the quantization noise level can be set to be proportional to the background noise and residual interference level, as a near optimal solution for sum-rate maximization. At step 330, the BS quantizes, according to the determined quantization noise levels, a combination signal of the user signals at the base station using Wyner-Ziv coding or the single user compression algorithm. At step 340, the BS relays the quantized combination signal to the central processor.

In another embodiment of the VMAC-WZ scheme, for the uplink MCP model with sum backhaul capacity C, the following rate tuple $(R_1, R_2, \ldots, R_L)$ per real transmit dimension is achievable as $$\sum_{i \in S} R_i \leq \frac{1}{2} \log \frac{|H_S K_{X(S)} H_S^T + \Lambda_q + \sigma^2 I|}{|\Lambda_q + \sigma^2 I|}$$

subject to $$\frac{1}{2} \log \frac{|HK_X H^T + \Lambda_q + \sigma^2 I|}{|\Lambda_q|} \leq C$$

for all $S \subseteq \{1, 2, \ldots, L\}$. The scheme uses numerical optimization of quantization levels. Specifically, the sum-rate $$\frac{1}{2} \log \frac{|HK_X H^T + \sigma^2 I + \Lambda_q|}{|\sigma^2 I + \Lambda_q|}$$

is maximized subject to the sum backhaul constraint $$\frac{1}{2} \log \frac{|HK_X H^T + \sigma^2 I + \Lambda_q|}{|\Lambda_q|} \leq C,$$

where $\Lambda_q(i,j)=0$, for $i \neq j$ and $\Lambda_q(i,j)>0$. The optimization is over all diagonal terms of $\Lambda_q$ subject to the constraint that they are not negative. The above optimization problem is nonconvex. However, the Karush-Kuhn-Tucker (KKT) condition of the problem is still a necessary condition for optimality. To derive the KKT condition, the following Lagrangian is formed:
$(1-\lambda)\mathrm{diag}(HK_X H^T + \sigma^2 I + \Lambda_q)^{-1} - (\sigma^2 I + \Lambda_q)^{-1} = 0$, where $\lambda$ is the Lagrangian dual variable which controls the backhaul capacity constraint. The optimal $\Lambda_q$ satisfies the optimality condition above.

To solve this optimization problem, the value of $\lambda$ is kept fixed and $A_{ii}$ is set to be the i-th diagonal of $(HK_X H^T + \sigma^2 I + \Lambda_q)^{-1}$. In a solution approach assuming high SNR, $A_{ii}$ is approximately equal to 0 and $$q_i^* = \frac{\lambda}{1-\lambda}\sigma^2.$$

In another solution approach, $\Lambda_q$ is first initialed as $\Lambda_q^{(0)} = \beta I$ and a small numbers $\epsilon > 0$ is selected. At a second step, qi is set to be the root of the following equation $$(1-\lambda)A_{ii}^{(j-1)} + \frac{\lambda}{q_i} = \frac{1}{\sigma^2 + q_i}.$$

If multiple roots exist, the root that maximizes the Lagrangian as formulated above is selected. At a third step, $A_{ii}^{(j)}$ is updated by setting it equal to the i-th diagonal element of $(HK_X H^T + \sigma^2 I + \Lambda_q)^{-1}$. Next, j is incremented and the second step is repeated until $\|\Lambda_q^{(j)} - \Lambda_q^{(j-1)}\| \leq \epsilon \|\Lambda_q^{(j)}\|$. In both solution approaches, a suitable value of $\lambda$ is searched to satisfy a specific backhaul constraint.

In another embodiment of the VMAC-WZ scheme, for the uplink MCP model with sum backhaul capacity C, the following rate tuple $(R_1, R_2, \ldots, R_L)$ per complex transmit dimension is achievable as:

$$\sum_{i \in S} R_i \leq \log \frac{|H_S K_{X(S)} H_S^H + \Lambda_q + \mathrm{diag}(\sigma_i^2)|}{|\Lambda_q + \mathrm{diag}(\sigma_i^2)|}$$

subject to $$\log \frac{|\text{diag}(HK_X H^H) + \Lambda_q + \text{diag}(\sigma_i^2)|}{|\Lambda_q|} \le C.$$

Similar to the VMAC-WZ scheme above, this is a nonconvex optimization problem that can be solved under the KKT condition using the Lagrangian approach. The two solution approaches described above can be used to solve this problem. Details of the two nonconvex optimization problems above and their solutions are described by Yuhan Zhou et al. in "Uplink Multi-Cell Processing: Approximate Sum Capacity under a Sum Backhaul Constraint," and in "Uplink Cloud Radio Access Network with Capacity Limited Backhaul".

Figure 4:
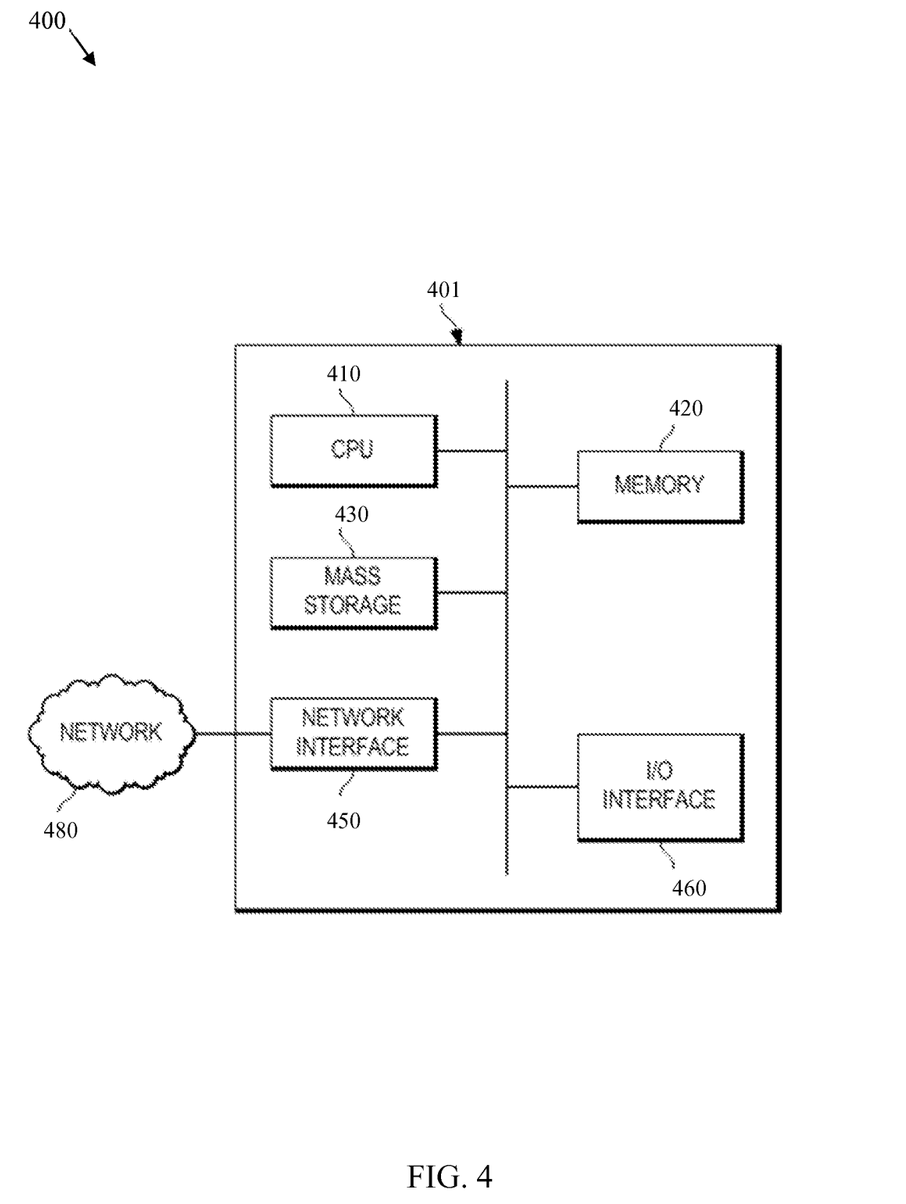
FIG. 4 is a diagram of a processing system that can be used to implement various embodiments.

FIG. 4 is a block diagram of an exemplary processing system 400 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral bus or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network component for supporting compress and forward relaying in joint multi-cell processing (MCP), the method comprising:
    establishing, by a network component in a wireless network, a weighted sum-rate maximization function which allows optimization of quantization noise levels for a plurality of backhaul links from a plurality of radio nodes to a network for joint MCP, wherein the weighted sum-rate maximization function is subject to a backhaul sum capacity constraint on the backhaul links;
    determining the quantization noise levels using an alternating convex optimization of the weighted sum-rate maximization function; and
    sending, by the network component, the quantization noise levels to the radio nodes, the quantization noise levels determining the allocation of backhaul resources on the backhaul links to the radio nodes.

2. The method of claim 1, wherein the weighted sum-rate maximization function is established in accordance with Wyner-Ziv coding and compression.

3. The method of claim 1, wherein the weighted sum-rate maximization function is established in accordance with a single user compression algorithm that excludes statistical correlations between user signals received at the radio nodes.

4. The method of claim 1 further comprising:
    receiving, from the radio nodes, signal combinations of user signals, wherein the signal combinations of user signals are quantized according to the quantization noise levels using Wyner-Ziv coding or a single user compression algorithm that excludes statistical correlations between the user signals at the radio nodes;
    obtaining the user signals by decompressing the signal combinations according to the Wyner-Ziv coding or the single user compression algorithm; and
    decoding the user signals.

5. The method of claim 1, wherein using the alternating convex optimization to determine the quantization noise levels includes:
    formulating the weighted sum-rate maximization function as a double maximization problem for a first group of variables and a second group of variables, wherein the first group of variables comprises the quantization noise levels;
    initializing the first group of variables and the second group of variables;
    repeating solving the first group of variables subject to fixing values of the second group of variables; and
    updating the second group of variables using the solved first group of variables until the first group of variables and the second group of variables converge in values.

6. The method of claim 5, wherein the weighted sum-rate maximization function becomes a convex optimization problem with optimal or near optimal solution when the second group of variables are fixed.

7. The method of claim 1 further comprising, upon determining that the backhaul sum capacity constraint and a signal-to-noise-ratio (SNR) of user signals received at the radio nodes are high beyond a threshold, setting the quantization noise levels to be proportional to background noise and residual interference levels of the user signals.

8. The method of claim 7, wherein setting the quantization noise levels proportional to the background noise and residual interference levels of the user signals includes:
   determining scaling factors for the quantization noise levels subject to an equality of a backhaul constraint function of the scaling factors and the backhaul sum capacity constraint; and
   calculating the quantization noise levels as a product of standard deviations of the background noise and residual interference levels and the scaling factors.

9. The method of claim 1, wherein the weighted sum-rate maximization function includes global channel state information corresponding to channels between the radio nodes and a plurality of user terminals.

10. The method of claim 1 further comprising upon determining that the backhaul sum capacity constraint and a signal-to-noise-ratio (SNR) of user signals received at the radio nodes are high beyond a threshold:
   establishing a Lagrangian function of the weighted sum-rate maximization function;
   choosing a suitable Lagrangian parameter that satisfies the backhaul sum capacity constraint; and
   resolving the quantization noise levels according to the Lagrangian function and a Karush-Kuhn-Tucker (KKT) condition.

11. The method of claim 1, wherein the radio nodes belong to multiple tier networks, and wherein establishing the weighted sum-rate maximization function includes:
   establishing the weighted sum-rate maximization function for the backhaul links from the radio nodes in the multiple tier networks to the network, wherein the weighted sum-rate maximization function is subject to one or more backhaul capacity constraints for the backhaul links of the multiple tier networks.

12. A method for compress and forward relaying in joint multi-cell processing (MCP), the method comprising:
   receiving, by a base station, a plurality of user signals from a plurality of user terminals, wherein the user signals are sent from the user terminals to a plurality of base stations including the base station;
   receiving an assigned quantization noise level from a network, wherein the assigned quantization noise level is one of a plurality of quantized noise levels determined for the base stations using an alternating convex optimization of a weighted sum-rate maximization function subject to a backhaul sum capacity constraint on backhaul links between the base stations and the network, the quantized noise levels determining the allocation of backhaul resources on the backhaul links to the base stations;
   quantizing a combination signal of the user signals according to the assigned quantization noise level; and
   relaying the quantized combination signal to the network.

13. The method of claim 12, wherein the combination signal is quantized using Wyner-Ziv coding according to the quantization noise levels.

14. The method of claim 12, wherein the combination signal is quantized, according to the quantization noise levels, using a single user compression algorithm that excludes statistical correlations between the user signals at the base stations.

15. The method of claim 12, wherein the weighted sum-rate maximization function includes global channel state information corresponding to channels between the base stations and the plurality of user terminals.

16. A network component for supporting compress and forward relaying in joint multi-cell processing (MCP) in a wireless network, the network component comprising:
   at least one processor; and
   a non-transitory computer readable storage medium storing programming for execution by the at least one processor, the programming including instructions to:
      establish a weighted sum-rate maximization function which allows optimization of quantization noise levels for a plurality of backhaul links from a plurality of radio nodes to the network component for joint MCP, wherein the weighted sum-rate maximization function is subject to a backhaul sum capacity constraint on the backhaul links;
      determine the quantization noise levels using an alternating convex optimization of the weighted sum-rate maximization function; and
      send the quantization noise levels to the radio nodes, the quantization noise levels determining the allocation of backhaul resources on the backhaul links to the radio nodes.

17. The network component of claim 16, wherein the instructions to establish the weighted sum-rate maximization function include further instructions to establish the weighted sum-rate maximization function in accordance with Wyner-Ziv coding and compression or a single user compression algorithm that excludes statistical correlations between user signals received at the radio nodes.

18. The network component of claim 16, wherein the programming includes further instructions to:
   receive, from of the radio nodes, signal combinations of user signals, wherein the signal combinations of the user signals are quantized according to the quantization noise levels using Wyner-Ziv coding or a single user compression algorithm that excludes statistical correlations between the user signals at the radio nodes; and
   obtain the user signals by decompressing the signal combinations according to the Wyner-Ziv coding or the single user compression algorithm.

19. The network component of claim 16, wherein the weighted sum-rate maximization function includes global channel state information corresponding to channels between the radio nodes and a plurality of user terminals, wherein the user terminals and the radio nodes are configured to transmit and receive user signals according to multiple-input and multiple-output (MIMO) technology.

20. The network component of claim 16, wherein the weighted sum-rate maximization function includes global channel state information corresponding to frequency selective channels between the radio nodes and a plurality of user terminals, wherein the user terminals and the radio nodes are configured to transmit and receive user signals according to the frequency selective channels using orthogonal frequency-division multiplexing (OFDM) or single-carrier modulation.

21. The network component of claim 16, wherein the network component is a central processing component of a cloud radio access network (CRAN).

22. A radio node for compress and forward relaying in joint multi-cell processing (MCP) in a wireless network, the radio node comprising:
- at least one processor; and
- a non-transitory computer readable storage medium storing programming for execution by the at least one processor, the programming including instructions to:
  - receive a plurality of user signals from a plurality of user terminals, wherein the user signals are sent from the user terminals to a plurality of base stations including the base station;
  - receive an assigned quantization noise level from a network, wherein the assigned quantization noise level is one of a plurality of quantized noise levels determined for the base stations using an alternating convex optimization of a weighted sum-rate maximization function subject to a backhaul sum capacity constraint on backhaul links between the base stations and the network, the quantized noise levels determining the allocation of backhaul resources on the backhaul links to the base stations;
  - quantize a combination signal of the user signals, according to the assigned quantization noise level, using Wyner-Ziv coding or a single user compression algorithm that excludes statistical correlations between the user signals at the base stations; and
  - relay the quantized combination signal to the network.

23. The radio node of claim 22, wherein the quantized noise levels are proportional to background noise and residual interference levels of the user signals.

* * * * *